United States Patent [19]

Napierski

[11] Patent Number: 4,477,966
[45] Date of Patent: Oct. 23, 1984

[54] METHOD OF AND APPARATUS FOR WINDING AND INSERTING COILS IN SLOTS OF STATOR OR ROTOR LAMINATION ASSEMBLIES OF ELECTRICAL MACHINES

[75] Inventor: Reinhard Napierski, Niddatal, Fed. Rep. of Germany

[73] Assignee: Statomat-Globe Maschinenfabrik GmbH, Niederdorfeldern, Fed. Rep. of Germany

[21] Appl. No.: 361,794

[22] Filed: Mar. 25, 1982

[30] Foreign Application Priority Data

Apr. 9, 1981 [DE] Fed. Rep. of Germany ....... 3114407

[51] Int. Cl.³ ............................................ H02K 15/06
[52] U.S. Cl. ....................................... 29/596; 29/734; 29/736
[58] Field of Search ................. 29/736, 732, 734, 596, 29/606

[56] References Cited

U.S. PATENT DOCUMENTS 4,291,459  9/1981  Barrera ................................. 29/734
4,299,025  11/1981  Lauer et al. ...................... 29/736 X Primary Examiner—Carl E. Hall
Attorney, Agent, or Firm—Larson and Taylor

[57] ABSTRACT

Apparatus and method for winding and inserting coils in slots of a stator or rotor lamination assembly, the coils being produceable on a former, said apparatus and method comprising a transfer tool for transferring said coils from said former onto an insertion tool, said transfer tool comprising annularly arranged parallel bars; and said insertion tool, comprising correspondingly annularly arranged parallel insertion blades, cover strip blades, and an axially mobile insertion ram, said insertion tool being able to introduce said coils into said slots, wherein in said apparatus, said bars are adapted to abut onto the radially internal side of said insertion blades still during at least a part of the insertion operation, and are movable together with said ram.

20 Claims, 11 Drawing Figures

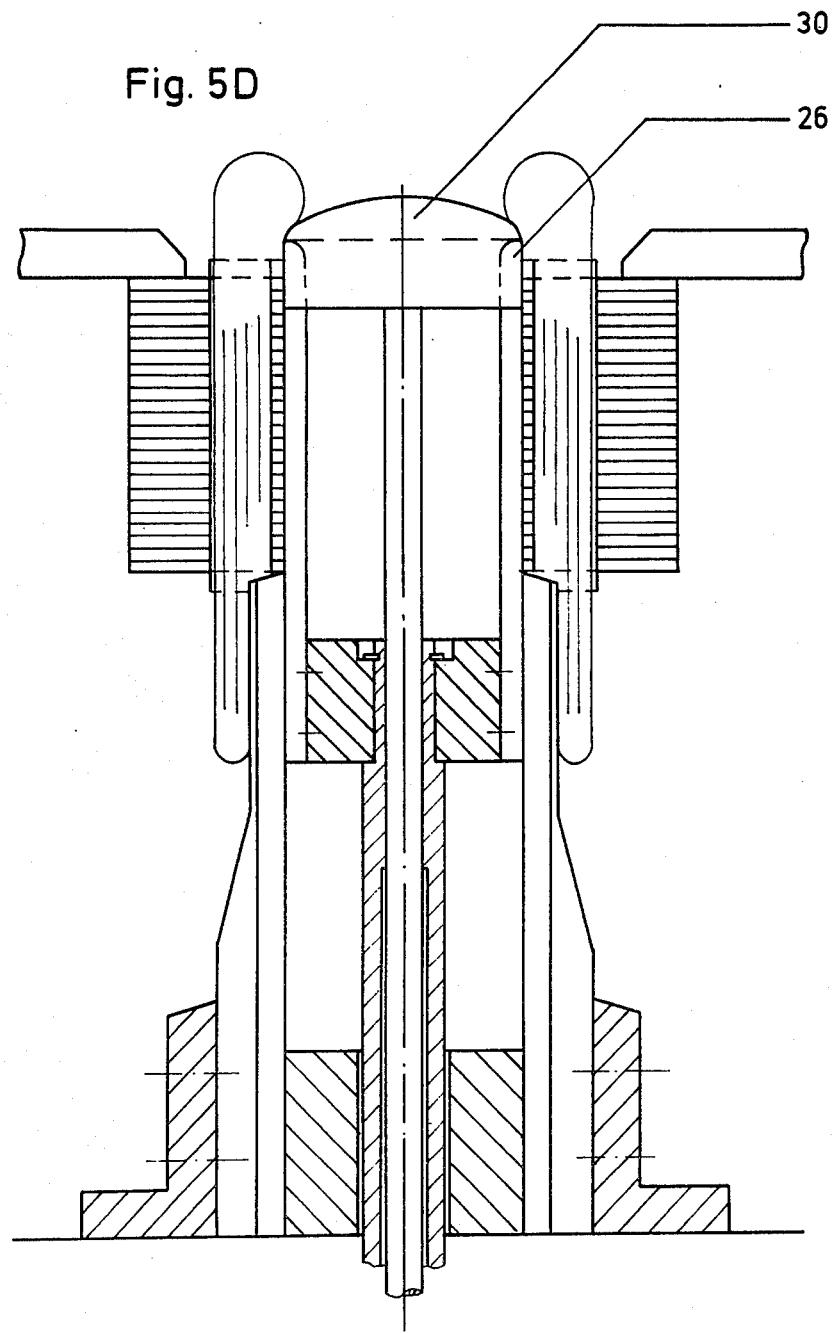

METHOD OF AND APPARATUS FOR WINDING AND INSERTING COILS IN SLOTS OF STATOR OR ROTOR LAMINATION ASSEMBLIES OF ELECTRICAL MACHINES

This invention relates to a method and apparatus for winding and inserting coils in slots of a stator or rotor lamination assembly of an electrical machine, the coils being produced on a former and transferred by means of a transfer tool onto an insertion tool, said transfer tool comprising annularly arranged parallel blades, said insertion tool comprising correspondingly annularly arranged parallel insertion blades, cover strip blades, and an axially mobile insertion ram, this tool being able to introduce said coils into said slots.

A method and apparatus suitable for carrying out a method of the aforesaid kind are known from, e.g., German published specification No. 1 589 860. Methods are also known wherein winding is carried out directly into an insertion tool without using a transfer tool (see German published specification No. 19 38 184). However, the latter requires specific conditions, as regards the construction of the machine, which are not always present.

Usually, coils are suspended between stationary insertion blades onto which a stator or rotor lamination assembly is placed (see, e.g., U.S. Pat. No. 3 324 536). To facilitate placing of a said assembly, it is known to use aligning elements (e.g., a so-called aligning star) whereby a stator lamination assembly and an insertion tool are centred and aligned in the circumferential direction before they come into engagement (see U.S. Pat. No. 3 893 490 and German laid-open specification No. 28 08 049). The setting and removal of such an aligning element, however, involves additional manipulations or mechanical arrangements and movements.

With specific size ratios between wire thickness and gap width between insertion blades, and also other disadvantageous factors, wire turns tend to jam in the gaps, when they are advanced along stationary blades by an insertion ram. One known remedy is to make one in each case of two insertion blades (which guide a specific coil strand) move together with said ram (see German Pat. No. 1 918 485). In this respect, it is known in the first phase of the insertion operation to move all the insertion blades together with said ram, then adjust the free ends of the insertion blades approximately to the level of the opposite end face of a stator lamination assembly, and finally carry out the remaining insertion stroke with said ram alone, this travelling in known manner to beyond the free ends of the insertion blades (see German laid-open specification No. 20 06 526 and German published specification No. 26 30 183). But, if all the insertion blades travel with the insertion ram, the centering and the precise and careful placing of the stator lamination assembly on the insertion blades presents difficulties. If for this reason, longer insertion blades are selected than are needed for receiving the previously wound coils, then a result is (where the free ends of the insertion blades travel only just to the opposite stator side with the insertion ram) that at the end of the insertion operation there is still a very long displacement travel for said ram with the insertion blades already stationary, so that wire jamming may result. Alternatively, it is necessary to travel with the free ends of the insertion blades in the first instance far beyond the stator lamination assembly, and to withdraw the blades again by this same length whilst the insertion ram is held fast temporarily only before said ram can carry out the last part of the insertion stroke.

It would be conceivable to make the insertion blades run from the opposite side to the insertion ram and into a stator bore, and to withdraw those blades at the insertion operation (see German Utility Model No. 79 30 007, FIG. 3). However, in that case, when inserting coils with a large number of turns (i.e. with a high coil structure between the insertion blades), those coils have to be removed already from the stator bore, after a proportion of the turns has been drawn through the stator bore and then has to be spread out radially in the region of the end turns, but another part of the turns is not yet drawn completely through the stator bore. After withdrawal of the insertion blades, as the travel of the insertion ram continues, these last-mentioned parts of the turns may be damaged on the sharp edges of the stator lamination assembly which are now no longer covered by the blades.

One object of the present invention is to provide a method and an apparatus of the kind initially specified, whereby conditions at the end of the insertion operation can be improved over the state of the art, and (if desired) simpler centering of a stator relative to the insertion tool can be achieved at the same time.

A first aspect of the present invention provides a method of winding and inserting coils in slots of a stator or rotor lamination assembly, the coils being producable on a former and transferable by means of a transfer tool onto an insertion tool, said transfer tool comprising annularly arranged parallel bars, said insertion tool comprising correspondingly annularly arranged parallel insertion blades, cover strip blades, and an axially mobile insertion ram, this tool being able to introduce said coils into said slots, wherein in said method, bars abut on the radially internal side of said insertion blades still during at least a part of the insertion operation, and are moved together with said ram.

A second aspect of the present invention provides apparatus for winding and inserting coils in slots of a stator or rotation lamination assembly, the coils being producable on a former, said apparatus comprising a transfer tool for transferring said coils from said former onto an insertion tool, said transfer tool comprising annularly arranged parallel bars; and said insertion tool, comprising correspondingly annularly arranged parallel insertion blades, cover strip blades, and an axially mobile insertion ram, said insertion tool being able to introduce said coils into said slots, wherein in said apparatus, said bars are adapted to abut onto the radially internal side of said insertion blades still during at least a part of the insertion operation, and are movable together with said ram.

One advantage of the invention is making the transfer tool (which normally only serves to transfer coils from the winder to the insertion tool) carry out additionally an important function in the insertion operation, i.e. the bars of the transfer tool serve as releasable extensions of the insertion blades. In this way, the result can be achieved that (depending on existing pre-requisites in each individual case as regards centering a said assembly, clamping of wire turns between insertion blades, height of the coil body in the insertion tool, length of the insertion blades, height of a said assembly, etc.) optimum insertion conditions can be provided in each case. The insertion blades can be run smoothly to the opposite face of a said assembly, or vice versa a said assembly pushed correspondingly far onto the insertion blades. There can be no risk that the coil wires will be damaged on the sharp edges of a said assembly.

In one preferred embodiment of the invention, the transfer tool or a plurality of transfer tools in succession can be brought each with a said assembly placed thereon and coils suspended between upwardly directed said bars to below said insertion tool, and then moved downwardly from above together with said insertion ram at the insertion operation. This method allows the use of a plurality of simple and inexpensive transfer tools which all co-operate with a single common insertion tool. It is novel to transport to the insertion station with the transfer tools not only the coils but at the same time stator or rotor lamination assemblies already placed on the bars (see in contrast German laid-open specification No. 28 25 557). This advantage can even be further developed by arranging that in the course of the winding and slipping-over of coils onto the transfer tool holding the stator or rotor lamination assembly, winding ends are connected to connecting terminals arranged in insulated manner on the stator or rotor lamination assembly (see in this connection German published specification No. 22 19 764 and German laid-open specification No. 23 20 865). This possibility is afforded only because according to the proposal provided hereinbefore the stator or rotor lamination assembly is already on the bars of the transfer tool during the winding operation.

The advantage achieved by the invention of facilitating centering and bringing together of the stator or rotor lamination assembly with the insertion tool without additional manipulation of an aligning star is noticeable not only in the case of automatic winding and insertion apparatus but also with simpler insertion apparatus. In such cases, the free ends of the insertion blades can be withdrawn almost to the free ends of the cover strip blades in the starting position, and even if (in a manner commonly employed) for easier placing of the stator or rotor lamination assembly, the central longitudinal axis of the insertion tool is directed upwards at an inclination. Even a high stator or rotor lamination assembly can be put-on in an inclined position and held securely once the bars of the transfer tool have been brought into engagement with the insertion blades as prolongations of said blades.

The present invention will now be described by way of example with reference to the accompanying drawings, wherein.

Figure 2:
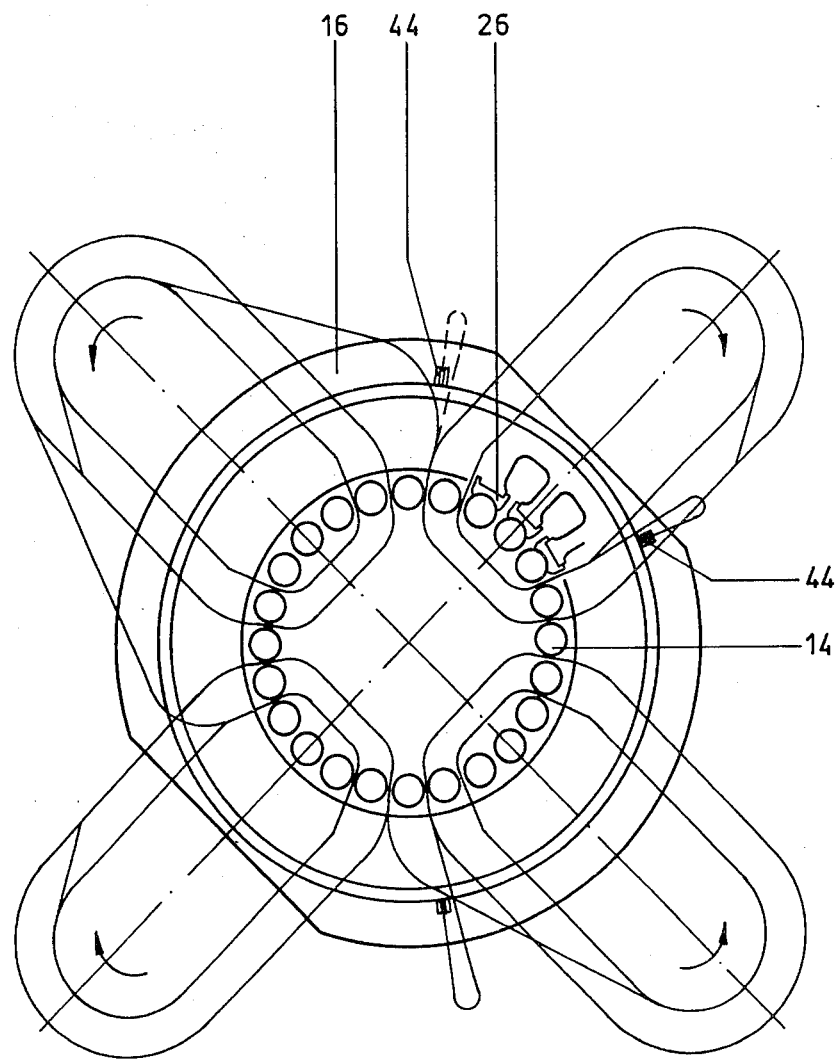
FIG. 2 shows a cross-section through transfer tool bars and insertion blades, for engagement according to FIG. 1B.
Figures 3A, 3B:
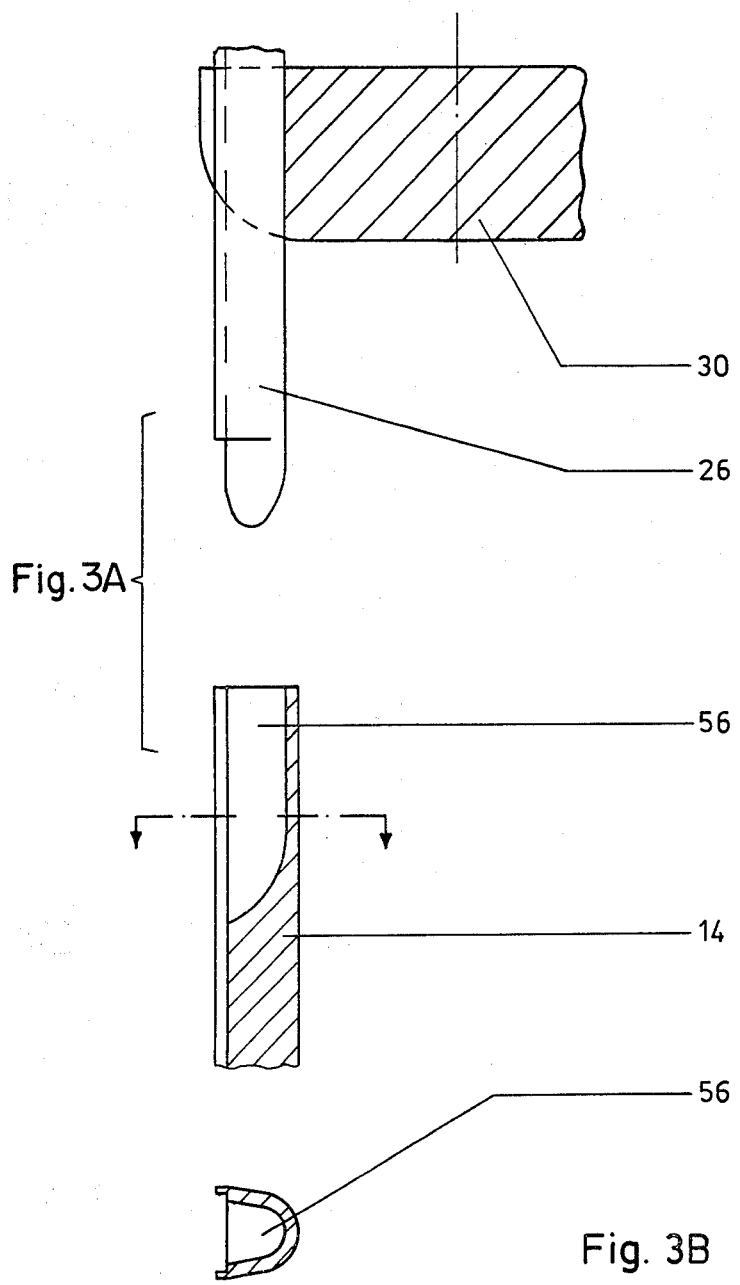

FIGS. 3A and 3B respectively show longitudinal and cross sections through an arrangement of transfer tool bars and insertion blades, modified relative to FIG. 2.

Figure 4:
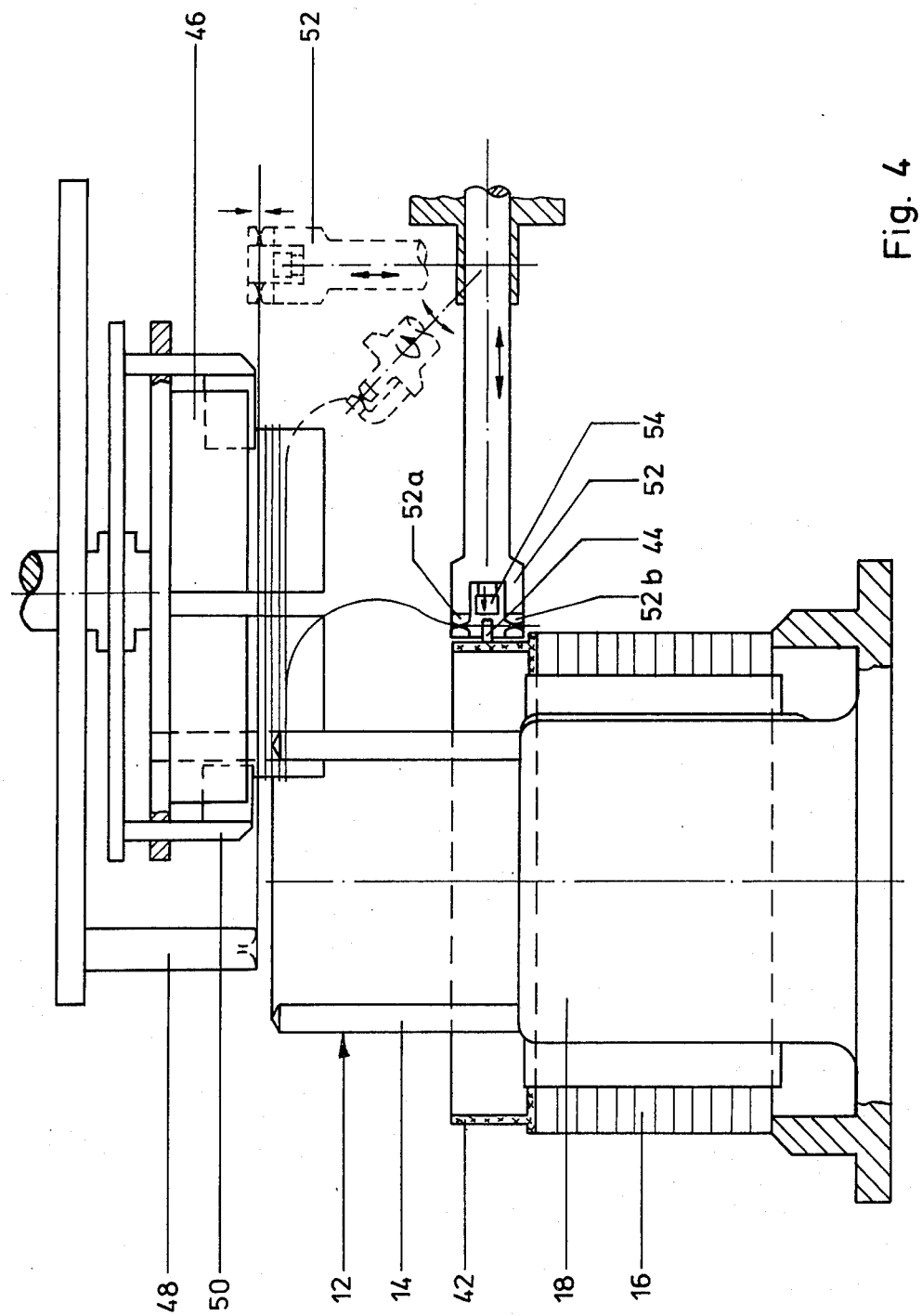

FIG. 4 shows a system for connecting winding ends to connecting terminals held in insulated manner on a stator lamination assembly, while a transfer tool according to FIG. 1 is situated below a winding former.

FIGS. 5A to 5D show longitudinal sections through a further embodiment of a transfer and insertion tool.

Figure 1A:
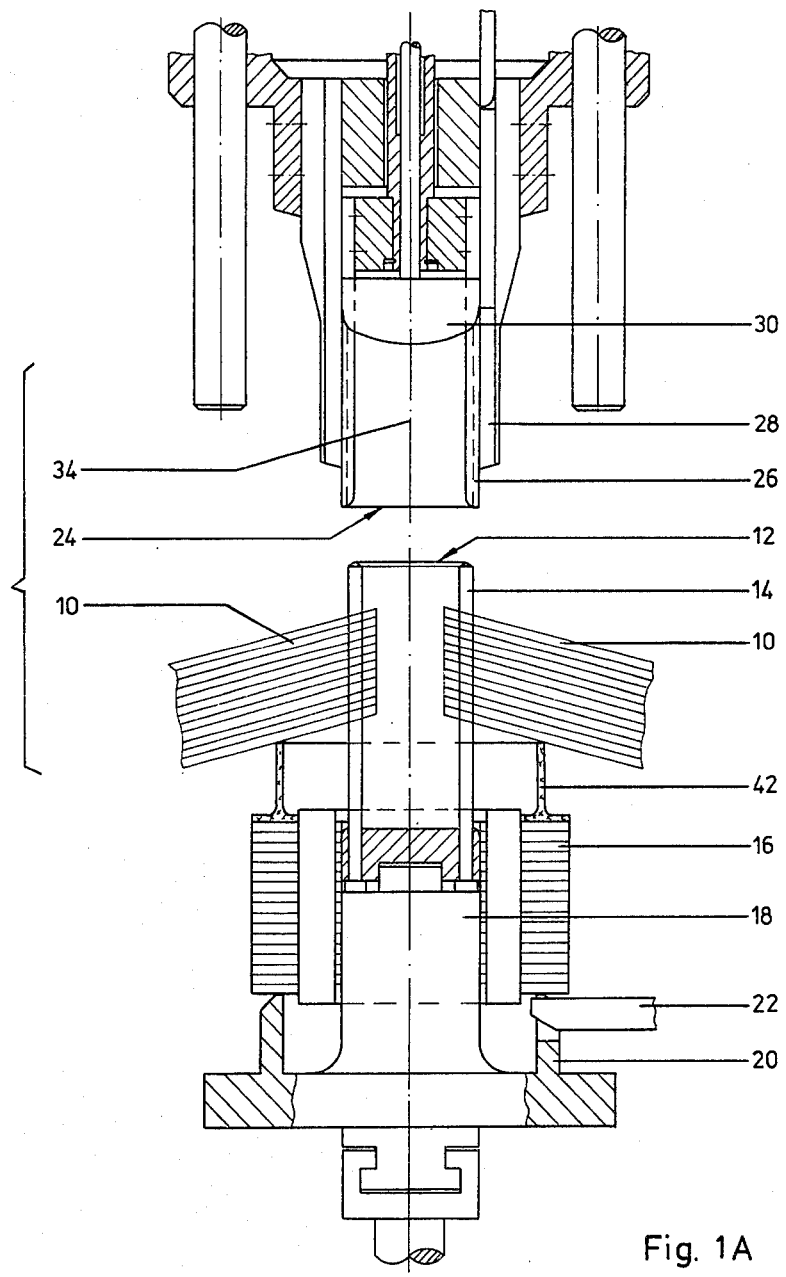
FIGS. 1A, 1B, 1C show simplified axial sections through one embodiment of transfer and insertion tool various positions before beginning, during, and ending an insertion operation.
Figure 1B:
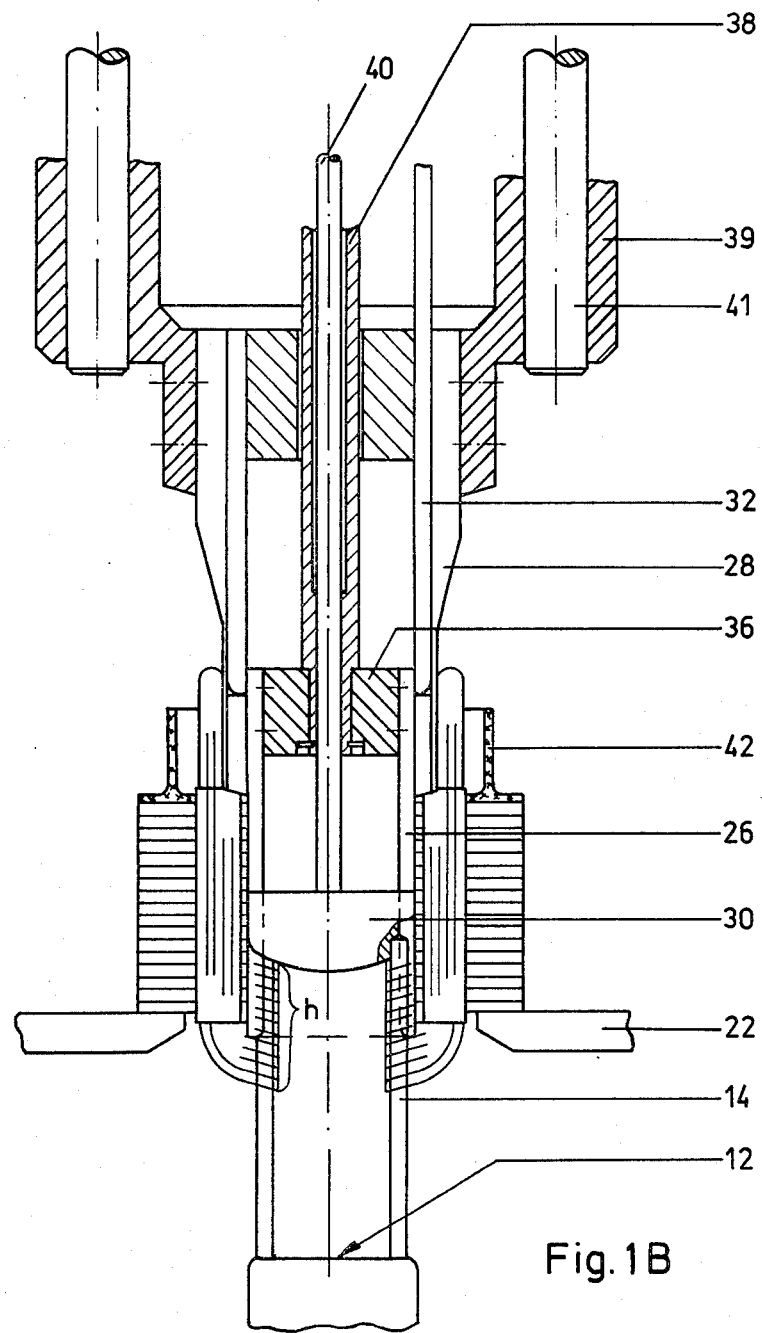
Figure 1C:
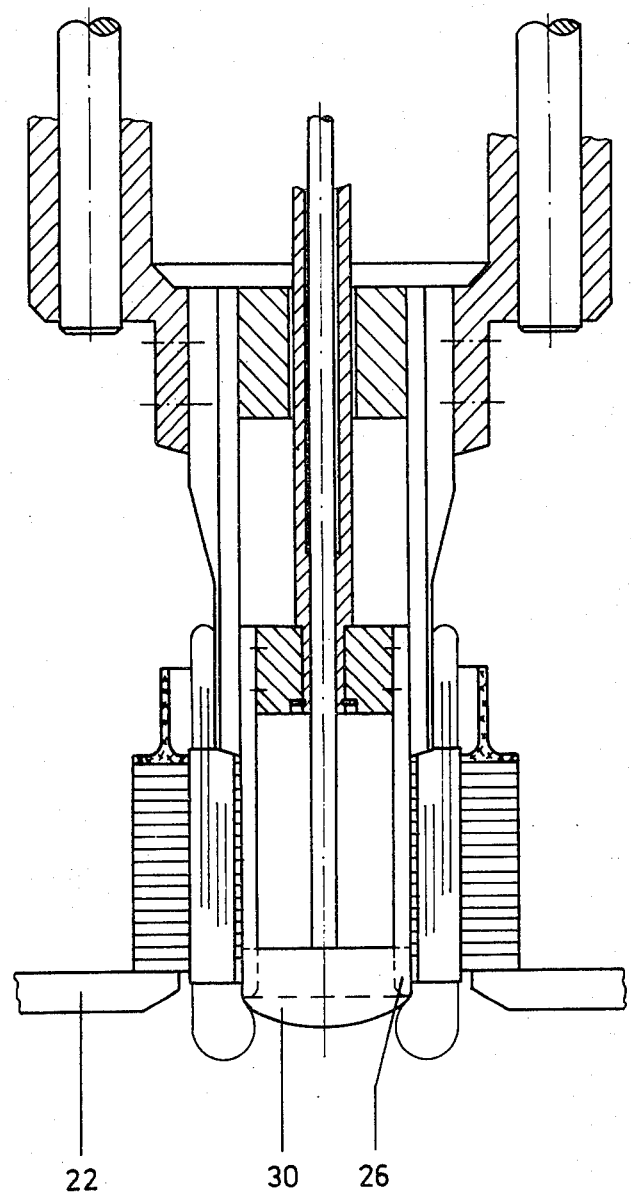

The transfer tool 12 shown in FIGS. 1A, 1B, 1C can be applied to an automatic winding and insertion apparatus having a construction described in German laid-open specification 28 25 557. But, as a departure from that installation, FIGS. 1A, 1B, 1C hereof show coils 10 which can be slipped from a winding former (not shown) into transfer tool 12, which comprises a ring of parallel bars 14 whose free ends are directed upwardly, and on each of which a stator lamination assembly 16 has been placed before coils 10 are introduced into gaps between bars 14. Transfer tool 12 has a base 18 that holds bars 14 and deals with pre-centering and aligning of stator lamination assembly 16 through a suitable diameter region and projections engaging into slots of assembly 16, or utilises other alignment elements than projections. Base 18 holds assembly 16 by means of a support 20, and is adapted to travel through connection with a conveyor apparatus (e.g. a conveyor belt or a turntable) between a winding station and an insertion station and possibly stations for placing assembly 16 onto transfer tool 12 and for removing the stator after insertion of coils 10. Transfer tool 12 is lowerable at least at the insertion station, while the stator lamination assembly 16 is held fast there by a holding device 22.

At an insertion station, laden transfer tool 12 arrives (see FIG. 1A) below a conventionally constructed insertion tool 24 comprising insertion blades 26, cover strip blades 28, an insertion ram 30, and cover strip slides 32 (see FIG. 1B). One aspect of the invention provides that (with respect to the common central longitudinal axis of transfer tool 12 and of insertion tool 24) the central longitudinal axes of individual bars 14 and of associated insertion blades 26 are situated in the same radial planes; i.e., bars 14 and the respective associated insertion blades 26 substantially are in alignment with one another, although radially slightly offset relatively to one another because of mutual engagement. Bars 14 and also insertion blades 26, however, are suitable for covering sharp edges of the bars or teeth of the stator lamination assembly 16 between slots of assembly 16 in each case so that wires of coils 10 cannot be damaged thereon.

In the embodiment according to FIGS. 1A, 1B, 1C, all insertion blades 26 travel uniformly with one another, because their rear ends (see FIG. 1B) are connected securely to a blade holder 36, which can be axially advanced and withdrawn through a tube 38 and a reciprocating drive known per se.

Independently of insertion blades 26, the insertion ram 30 can be axially advanced and withdrawn by a reciprocating drive (not shown) via a rod 40 guided in tube 38. Axial drives of insertion blades 26 and of insertion ram 30 can be so controlled that during the first part of the insertion stroke (which leads from the position shown in FIG. 1A substantially into the position shown in FIG. 1B) the insertion ram 30 and insertion blades 26 advance jointly. Cover strip slides 32 are advanced in known manner, so that insulating cover strips, which are guided between cover strip blades 28, are pushed into the stator slots.

In FIG. 1B, the free ends of insertion blades 26 lead relatively to insertion ram 30 only by the distance which is optimal for completing the insertion operation in the last phase thereof in accordance with the particular conditions. As a rule, the height of the structure of the coils 10 in the insertion of transfer tool designated as "h" in FIG. 1B will be greater than the amount by which the free ends of insertion blades 26 project beyond insertion ram 30. However, even for those coil wire turns which precede in the insertion operation there is no risk of damage on the sharp edges of the stator lamination assembly, because these are covered also by bars 14 which are in engagement with insertion blades 26. After the coil turns which precede in the insertion operation as in FIG. 1B have been drawn completely through the stator bore and then the insertion blades 26 cover the stator teeth as far as the ends thereof, transfer tool 12 can be withdrawn completely downwards from the position shown in FIG. 1B, so that the turns of the coils 10 which lead in the insertion operation can be fanned out radially to form the overhangs or end turns.

After withdrawal of transfer tool 12, the insertion blades 26 remain in the positions as in FIG. 1B, but insertion ram 30 continues its downwardly directed insertion stroke to beyond the position shown in FIG. 1C and the lower end face of the stator lamination assembly, whereat all the wire turns are moved out of the gaps between insertion blades 26 and to beyond free ends thereof and shaped-out radially. In known manner, the cover strip slides 32 are advanced to such an extent when that happens that at the end the cover strips have reached their predetermined position in the slots of the stator lamination assembly. The parts of insertion tool 24 are then again withdrawn upwardly into the starting position shown in FIG. 1A, whereupon the stator provided with inserted coils 10 is moved away, and the next transfer tool 12 with stator lamination assembly 16 and coils 10 as in FIG. 1A is brought into the insertion station.

The insertion operation according to FIGS. 1A to 1C can be further promoted somewhat by providing that cover strip blades 28 (which in the first instance advance from the position shown in FIG. 1A by displacement of holder 39 of insertion tool 24 along guide columns 41 up to abutment on the stator lamination assembly as in FIG. 1B) after introduction of the forward ends of the cover strips into the slots of the stator lamination assembly are withdrawn again somewhat, so that the rear winding ends of coils 10 can be brought closer to the stator bore and as a result the coils can be inserted further before transfer tool 12 is withdrawn from insertion tool 24.

A special axial drive is needed for transfer tool 12, for moving bars 14 out of the position shown in FIG. 1B downwardly off the free ends of insertion blades 26. This special drive, however, need be activated only for this withdrawing movement. During the first phase of the insertion operation (wherein insertion blades 26 and bars 14 of transfer tool 12 travel jointly with insertion ram 30), the transfer tool 12 can be entrained by the insertion blades 26 or insertion ram 30. But, the special axial drive of transfer tool 12 during the insertion operation also affords the possibility of providing part of the total insertion force required for inserting the coils into the stator slots, this being greatest in the first phase of the insertion operation, in that the wires are entrained by the bars 14 as a result of friction. Also, there is the further possibility of moving bars 14 already during the first phase of the insertion operation somewhat more quickly than insertion ram 30 and insertion blades 26, so that, when the speeds are suitably adapted to each other, the free ends of bars 14 are withdrawn from the free ends of insertion blades 26, just at the instant when the latter have reached their end position shown in FIG. 1B and in which they remain stationary.

FIG. 1B also shows that it would not be sufficient to use only bars 14 and not insertion blades 26 for guiding coils 10 in the insertion operation. With a relatively large coil structure, it is necessary (for example when the position shown in FIG. 1B is reached in the insertion operation) to withdraw transfer tool 12 entirely so that the coil turns which precede in the insertion operation are left free and can spread out radially. If insertion blades 26 were not still additionally present at that time, the coil turns which are at the rear in the insertion operation would be slid along the sharp edges of the stator lamination assembly, which would no longer be covered and would very probably be damaged.

Depending on particular kinds of employment, not all slots of the stator lamination assembly are occupied with coils always. It may also happen that only specific coils, and not all the coils, to be inserted in a stator lamination assembly tend to jam between the insertion blades or the bars of the transfer tool. The invention optionally includes the possibility (depending on the particular circumstances in the individual case) of constructing some or all insertion blades to be co-travelling and/or making them co-operate with transfer tool bars serving as prolongations.

In FIG. 1B, the stator lamination assembly 16 is connected to an insulating ring 42, which can be provided in known manner with connecting terminals 44 (see FIG. 4), to which the winding ends are applied and secured. This operation as FIG. 4 shows can be substantially simplified with the transfer tool shown in FIG. 1. FIG. 4 shows a transfer tool 12 with a stator lamination assembly 16 already placed on a stand in a winding station below a winding former 46. A winding nozzle 48 circulating about former 46 produces on former 46 the coil turns, which in this example are pushed by axially reciprocatingly operated stripper elements 50 (as per German Pat. No. 23 09 837) down from former 46 and between bars 14 of transfer tool 12. Depending on the position of winding nozzle 48, the wire being wound has a well-defined position between nozzle 48 and former 46, and can be taken up by a clamping device 52 with two clamping tongs 52a and 52b arranged with spacing between these tongs and a cutting device known per se (not shown here), and brought thus held taut to the connecting terminals 44, and secured thereto e.g. by means of a plunger 54 situated between clamping tongs 52a and 52b. This advantageous procedure is made possible by stator lamination assembly 16 (or at least the ring 42) being already in a specific position on transfer tool 12 when winding into the transfer tool 12. Because the illustrated high ring 42 does not allow bandaging of the end turns, either a further concentric ring can be inserted additionally which holds the end turns outside the stator bore, or a ring can be used which is so flat that it does not hinder bandaging.

FIGS. 2 and 3 show various constructions of the insertion blades 26 and bars 14 which are to be brought into engagement with one another.

In FIG. 2, the insertion blades 26 have at their radially internal side a groove into which in this example round bars 14 of transfer tool 12 engage. In the engagement position, the bars 14 stabilise insertion blades 26. The diameters of bars 14 are so chosen that the gap width between the bars corresponds substantially to the gap width between insertion blades 26. The spacing between bars 14 may even be somewhat smaller than the gap width between insertion blades 26.

In FIG. 3A and FIG. 3B, the insertion blades 26 and bars 14 of transfer tool 12 (except for the free ends in each case) have substantially the same cross-section which engages about the stator teeth. Only at the free ends are the cross-sections of insertion blades 26 set back and reduced, so that each cross-section fits into a substantially U-shaped recess 56 in the free ends of bars 14. In this region, the insertion blades 26 do not have the small radially outwardly directed projections which engage about the stator teeth.

Many other constructional forms and cross-sections for insertion blades 26 and bars 14 are available for allowing them to be brought into engagement in axial alignment with one another, but care is to be taken that where possible the free ends of insertion blades 26 retain their protective and guiding function, and that the free ends of bars 14 do not form any obstacle when slipping the wire turns from winding former 46 onto transfer tool 12. FIG. 1B indicates it is possible for bars 14 to engage with their free ends in insertion ram 30 in the first phase of the insertion operation, in which insertion ram 30 is moved synchronously with bars 14.

FIGS. 5A to 5D show a simpler apparatus wherein a manually operatable transfer tool 58 is used. The insertion tool 24 in FIG. 5 can have basically the same construction as insertion tool 24 of FIG. 1. The above remarks also apply to bars 14 of transfer tool 58.

Otherwise than in FIG. 1, FIGS. 5A, 5B, 5C, 5D show insertion blades 26 directed upwardly at an inclination or perpendicularly, and insertion ram 30 moves upwardly from below at the insertion stroke. Previously wound coils 10 are carried with the use of transfer tool 58 (provided with a handle 60) to insertion tool 24, whose insertion blades 26 in the starting position according to FIG. 5A take up preferably a position withdrawn substantially almost to the free ends of cover strip blades 28. Transfer tool 48 is brought into engagement with insertion tool 24, and at first left in this position shown in FIG. 5A. Coils 10 are transferred between insertion blades 26 and cover strip blades 28, but also remain between bars 14, which in the example here are inserted into insertion ram 30.

Figure 5A:
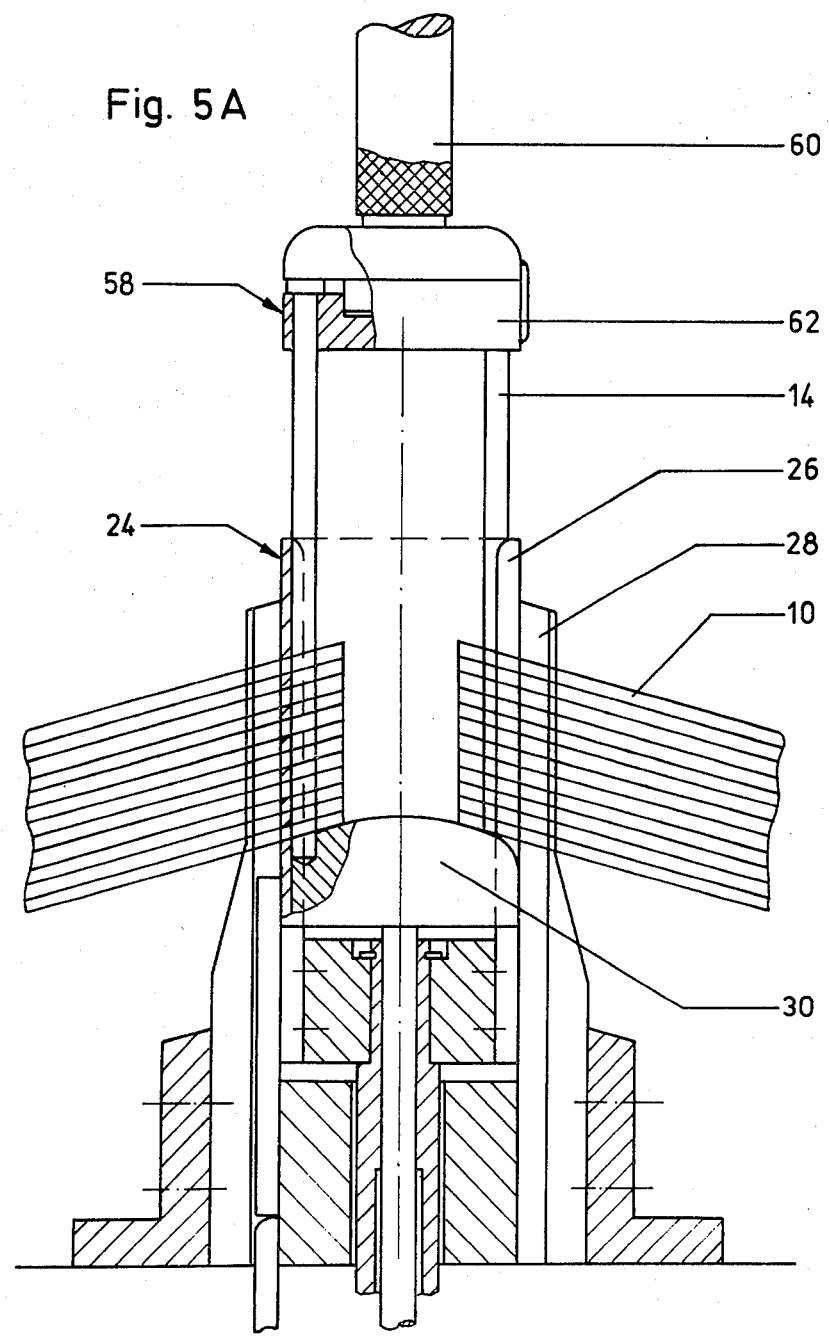

Without the aid of an additional aligning star, a stator lamination assembly 16 can then be placed on the insertion tool 24 (shown in FIG. 5D). The base plate 62 of transfer tool 58 can then serve the purpose of an aligning star by suitable cross-sectional form. Transfer tool 58 coupled with insertion tool 24 also provides secure support even for a relatively high stator lamination assembly on an obliquely upwardly directed insertion tool 24 with insertion blades 26 substantially withdrawn according to FIGS. 5A and 5B.

Figure 5B:
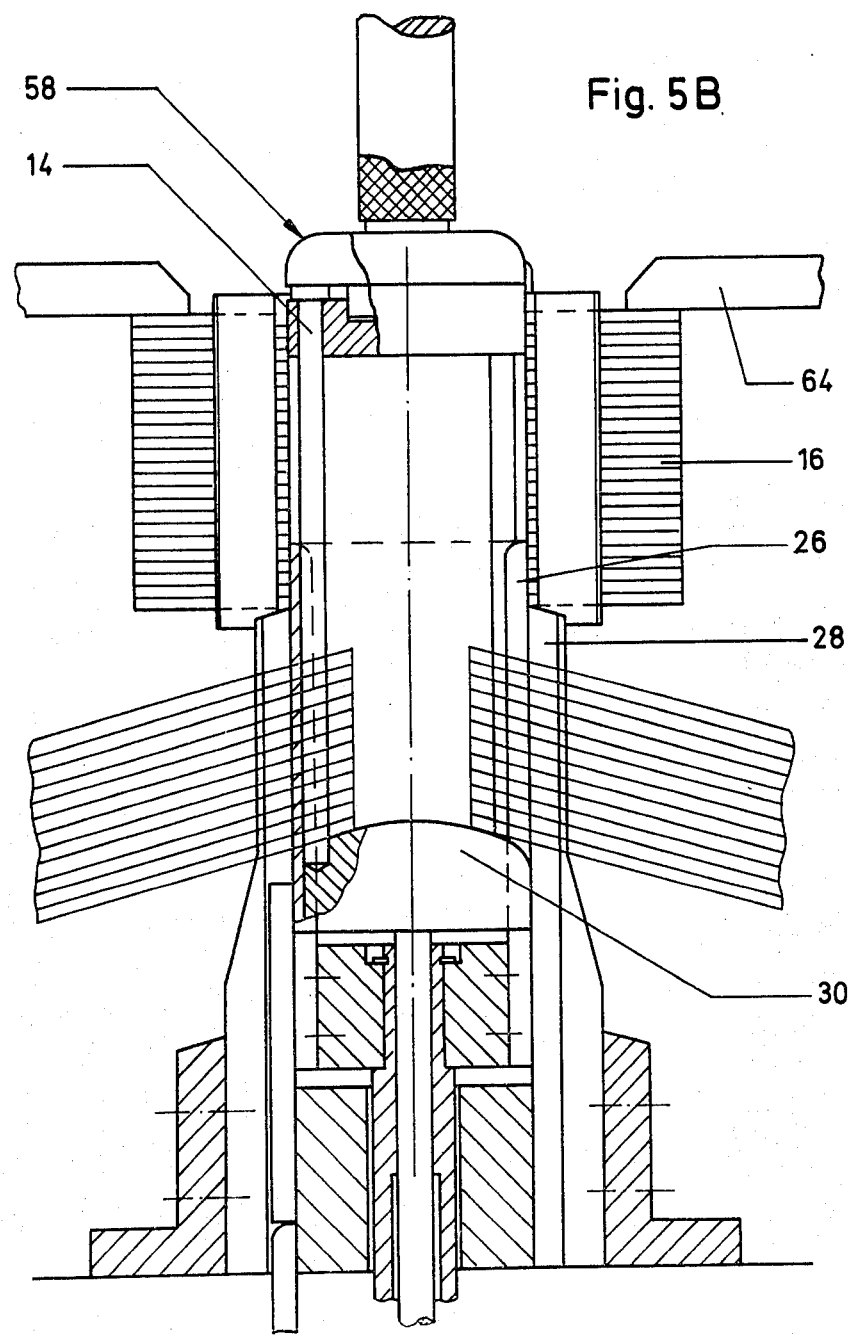
Figure 5:
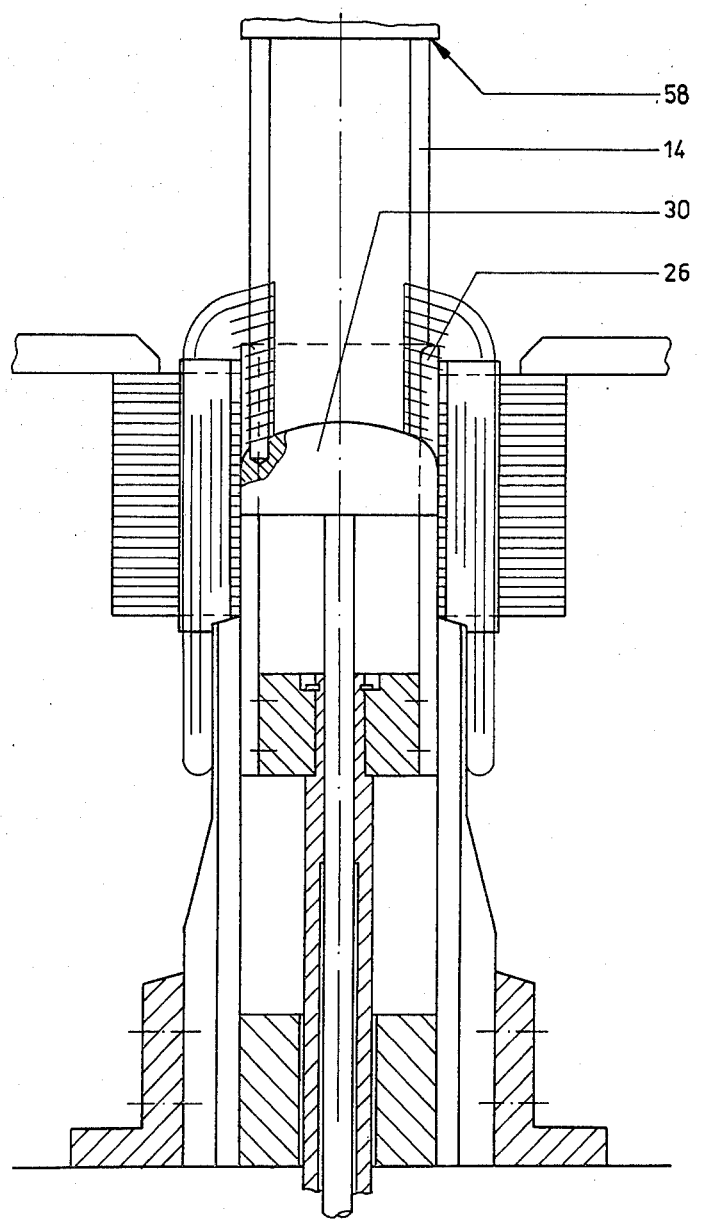

During the insertion operation, the stator lamination assembly 16 is held in a manner known per se by a holding device 64 (see FIG. 5B). During the first part of the insertion stroke, the insertion blades 26 and insertion ram 30 travel jointly upwards, transfer tool 58 also being carried along in the movement. In the position in FIG. 5C, the drive of insertion blades 26 stops, and insertion ram 30 also stands still. Transfer tool 58 is then drawn out upwards, and then insertion ram 30 completes the insertion stroke in the usual way, and there is no longer a risk of damaging the coil wires on the sharp edges of the stator lamination assembly, because insertion blades 26 have already advanced as far as the top edge of the stator in the first phase of the insertion stroke. At the end, the position shown in FIG. 5D is achieved, and subsequently insertion ram 30 and insertion blades 26 are withdrawn into the starting position, and the stator taken off so that a new working cycle can begin.

I claim:

1. Method of winding and inserting coils in slots of a stator or rotor lamination assembly, the coils being producable on a former and transferable by means of a transfer tool onto an insertion tool for introducing said coils into said slots, said transfer tool comprising annularly arranged parallel bars, and said insertion tool comprising corresponding annularly arranged parallel insertion blades, cover strip blades, and an axially movable insertion ram, wherein in said method said bars of said transfer tool are caused to abut with the radially internal side of said insertion blades of said insertion tool during at least a part of the insertion operation, and are moved together with said ram.

2. Method according to claim 1, wherein said bars are introduced into said insertion tool until contact is achieved with said ram, and are moved together with said ram in this relative position during the first phase of said insertion operation.

3. Method according to claim 1 or 2, wherein said bars are withdrawn from said insertion blades when the latter during the course of said insertion operation have reached a position in which they cover the edges between adjacent slots of said assembly over the entire length thereof, and end turns of said coils are then shaped-out radially by said ram.

4. Method according to claim 3, wherein before the conclusion of said insertion operation, those ends of said cover strip blades which abut said assembly endwise up to that time are then withdrawn to such an extent that the coils can be inserted further.

5. Method according to claim 1, wherein said assembly is aligned and centered on the transfer tool before said assembly contacts said insertion tool.

6. Method according to claim 1, wherein a plurality of said transfer tools are each, in succession, brought, with a said assembly placed thereon and coils suspended between upwardly directed ones of said bars, to below the insertion tool and then moved downwardly from above with said insertion tool during said insertion operation.

7. Method according to claim 6, wherein in the course of winding and slipping-over of coils onto said transfer tool, winding ends are connected to connecting terminals arranged in insulated manner on said assembly.

8. Apparatus for winding and inserting coils in slots of a stator or rotation lamination assembly, the coils being producable on a former, said apparatus comprising a transfer tool for transferring said coils from said former onto an insertion tool for introducing said coils into said slots, said insertion tool comprising annularly arranged parallel insertion blades, cover strip blades, and an axially movable insertion ram, said transfer tool comprising corresponding annularly arranged bars which abut with the said insertion blades during at least a part of the insertion operation, and move together with said ram.

9. Apparatus as claimed in claim 8, wherein at least some of said insertion blades co-operate during said insertion operation with said bars, and said bars form removable extensions of said insertion blades.

10. Apparatus according to claim 9, wherein said bars are displaced by sliding along on said insertion blades, radially internally thereof.

11. Apparatus according to claim 9 or 10, wherein cross-section profiles of said insertion blades and of said bars engage, in use, in one another.

12. Apparatus according to claim 11, wherein said bars in the region of their free ends have substantially U-shaped cross-sections which, in use, engage laterally and radially internally about the cross-section profiles of said insertion blades.

13. Apparatus according to claim 12, wherein said insertion blades at the region surrounded by the U-shaped regions of said bars are appropriately reduced in cross-section so that in the engaged state the flanks of said insertion blades and of said bars are in alignment with one another.

14. Apparatus according to claim 9, wherein the free ends of said bars are, in use, brought into engagement with said ram.

15. Apparatus according to claim 9, wherein the free ends of said bars are, in use, brought into engagement with the free ends of said insertion blades.

16. Apparatus according to claim 9, wherein at least some of said insertion blades travel together with said ram during at least part of the insertion stroke.

17. Apparatus according to claim 9, wherein said bars travel together with said ram during at least part of the insertion stroke.

18. Apparatus according to claim 9, wherein said bars or a supporting plate connected thereto include aligning elements for engaging in at least one said slot.

19. Apparatus according to claim 9, wherein said bars are removable from the free ends of said insertion blades when these extend substantially completely along said assembly, so that, in this position of said insertion blades, end turns of coils can be shaped by said ram radially over the free ends of said insertion blades.

20. Apparatus according to claim 9, wherein there is a plurality of said transfer tools, movable between a winding station and an insertion station, with upwardly directed said bars onto which a said assembly can be placed in each case before the winding station and between which said coils can be suspended in the winding station, and in the insertion station said insertion blades and said ram are introduceable from above into a bore in said assembly, and the said bars are movable downwardly out of said assembly.

* * * * *